No. 744,121. PATENTED NOV. 17, 1903.
J. SMAILL.
MEANS FOR DETERMINING THE QUANTITY OF LIQUID IN REFRIGERATING APPARATUS.
APPLICATION FILED APR. 22, 1903.
NO MODEL.
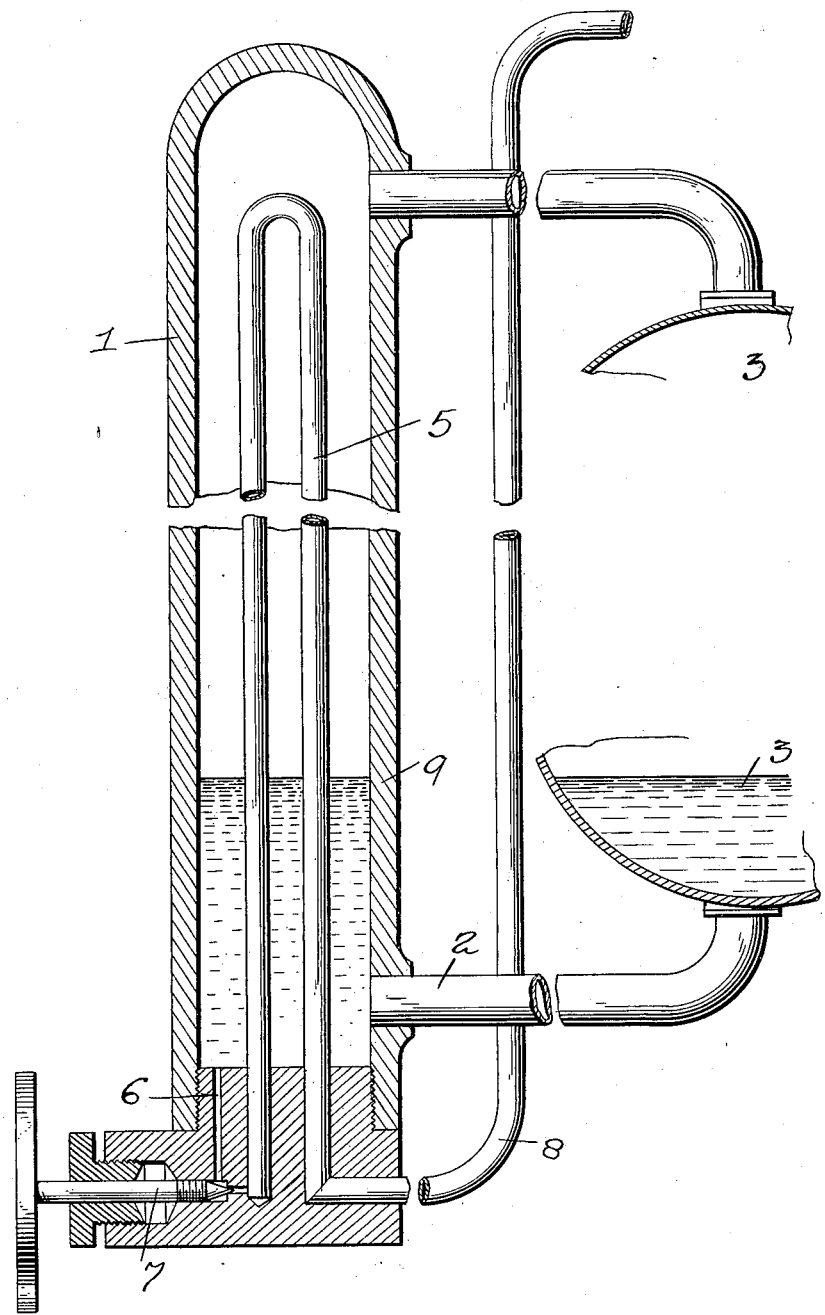
Attest:
C. A. Middleton
Edw. L. Reed
Inventor
John Smaill.
by Richards &...
Atty's No. 744,121. Patented November 17, 1903.

UNITED STATES PATENT OFFICE.

JOHN SMAILL, OF PORT CHALMERS, NEW ZEALAND.

MEANS FOR DETERMINING THE QUANTITY OF LIQUID IN REFRIGERATING APPARATUS.

SPECIFICATION forming part of Letters Patent No. 744,121, dated November 17, 1903.

Application filed April 22, 1903. Serial No. 153,868. (No model.)

*To all whom it may concern:*

Be it known that I, JOHN SMAILL, refrigerating engineer, of Port Chalmers, New Zealand, have invented a certain new and useful Improved Means for Determining the Quantity of Liquid in Refrigerating Apparatus, of which the following is a specification.

In the working of the ammonia system of freezing one of the most important things is to know exactly how much ammonia is contained in the system. A large header or reservoir is usually supplied with all plants of whatever make, and to know what quantity of liquid ammonia is contained in this reservoir gages are fitted with glass tubes, so that the level of the ammonia is readily seen. The objection, which is practically prohibitive, is that should the glass break there will be a great loss of ammonia, if not a total loss. Automatic valves are sometimes fitted; but these, owing to corrosion, grit, and other causes due to infrequent use, fail to act when required.

This invention provides a ready means of finding the exact quantity of liquid in the reservoir.

It consists of an apparatus for reducing below freezing-point the temperature of the liquefied agent used for freezing purposes. The liquid so cooled will show a clear frost-line externally on the device, indicating exactly the level of the liquid contained therein and in the reservoir.

The invention consists, preferably, of a vertical column having pipe connections at top and bottom with the reservoir. The top pipe connection, however, may be dispensed with. Inside the column is fitted an expansion-pipe, controlled by a regulating-valve. A connection is provided to supply the expansion-pipe through the regulating-valve with liquid from the liquid contained in the column. The return end of the expansion-pipe is connected to the suction side of the refrigerating apparatus.

The action of the invention is as follows: The column containing the liquid surrounding the expansion-pipe will become externally frosted at the level of the contained liquid, owing to the fact that this liquid transmits cold from the expansion-pipe many times faster than the gas in the column does.

The accompanying drawing is a sectional view of the invention with connections to reservoir and part end view of reservoir.

A vertical gage-column 1 is connected by a lower branch pipe 2 with the bottom of a liquid-reservoir 3 and by an upper branch pipe 4 with the top of the liquid-reservoir. An expansion-pipe 5 is fixed within the gage-column, and one end of it is connected by means of a passage 6 to the inside of the column. The liquid in the reservoir attains the same level in the column, and the supply of this liquid to the expansion-pipe is controlled by a regulator 7. A branch pipe 8, leading from the return end of the expansion-pipe, connects with the suction side of the system. The liquid expanding in the expansion-pipe cools the liquid and gas in the column, and the cooling is transmitted more rapidly to the exterior of the column through the liquid contained in it than through the gas contained in it. There results a frost-line 9 on the exterior of the column, below which frost appears. This line goes up and down in accordance with the level of the liquid in the column which corresponds to the level of the liquid in the reservoir. Hence the level of this liquid can be ascertained by inspection, and consequently the quantity of same in the reservoir. By an obvious adaptation the frost-line may be shown on the outside of the reservoir.

Having now described my invention, what I claim as new, and desire to secure by Letters Patent, is—

1. Means for determining the quantity of liquid in refrigerating apparatus consisting of a reservoir, a vertical column, pipe connections between the reservoir and the column and means in the column for causing a line of frost on the outside of the column of the same extent as the liquid in the reservoir, substantially as described.

2. Means for determining the quantity of liquid in refrigerating apparatus consisting of a vertical column, pipe connections between the bottom of said vertical column and a reservoir, an expansion-pipe within said vertical column, a passage between said vertical column and said expansion-pipe, a regulating-valve in said passage, and a branch pipe between said expansion-pipe and the refrigerating system, substantially as described.

In witness whereof I have hereunto set my hand in presence of two witnesses.

JOHN SMAILL.

Witnesses:
A. J. PARK,
J. R. PARK.